United States Patent
Ueno

(10) Patent No.: US 9,868,854 B2
(45) Date of Patent: Jan. 16, 2018

(54) SHEET MANUFACTURING APPARATUS, SHEET MANUFACTURING METHOD, SHEET MANUFACTURED USING SHEET MANUFACTURING APPARATUS AND SHEET MANUFACTURING METHOD, AND COMPOSITE AND CONTAINER USED IN SHEET MANUFACTURING APPARATUS AND SHEET MANUFACTURING METHOD

(71) Applicant: SEIKO EPSON CORPORATION, Tokyo (JP)

(72) Inventor: Yoshihiro Ueno, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 187 days.

(21) Appl. No.: 14/847,272

(22) Filed: Sep. 8, 2015

(65) Prior Publication Data
US 2016/0068681 A1    Mar. 10, 2016

(30) Foreign Application Priority Data
Sep. 9, 2014  (JP) ................................. 2014-182998

(51) Int. Cl.
| | |
|---|---|
| *C08L 91/06* | (2006.01) |
| *D04H 1/732* | (2012.01) |
| *D04H 1/60* | (2006.01) |
| *D04H 1/587* | (2012.01) |
| *B05D 3/00* | (2006.01) |
| *C08L 67/00* | (2006.01) |

(52) U.S. Cl.
CPC ............ *C08L 91/06* (2013.01); *B05D 3/007* (2013.01); *C08L 67/00* (2013.01); *D04H 1/587* (2013.01); *D04H 1/60* (2013.01); *D04H 1/732* (2013.01)

(58) Field of Classification Search
None
See application file for complete search history.

(56) References Cited

U.S. PATENT DOCUMENTS

| | | | |
|---|---|---|---|
| 3,215,678 A | 11/1965 | Adelman | |
| 5,432,000 A * | 7/1995 | Young, Sr. ............. | D04H 1/425 428/357 |
| 6,028,133 A * | 2/2000 | Peek ........................ | C08G 8/10 428/485 |
| 6,305,920 B1 * | 10/2001 | Kean ........................ | D04H 1/72 264/122 |
| 6,459,013 B1 | 10/2002 | Himmelsbach | |

(Continued)

FOREIGN PATENT DOCUMENTS

| | | |
|---|---|---|
| EP | 0629651 B1 | 10/1998 |
| JP | 03-059070 A | 3/1991 |

(Continued)

OTHER PUBLICATIONS

The Extended European Search Report for the corresponding European Application No. 15183773.9 dated Feb. 4, 2016.

*Primary Examiner* — Mary Lynn F Theisen
(74) *Attorney, Agent, or Firm* — Global IP Counselors, LLP

(57) ABSTRACT

A sheet manufacturing apparatus includes a mixing unit and a forming unit. The mixing unit is configured to mix fibers and a composite, where a resin and a wax are integrally combined, in air. The forming unit is configured to form a sheet by depositing and heating a mixed material where the fibers and the composite are mixed.

14 Claims, 3 Drawing Sheets

(56) References Cited

U.S. PATENT DOCUMENTS

| | | | |
|---|---|---|---|
| 6,592,983 B1 | 7/2003 | Carson et al. | |
| 2007/0181035 A1* | 8/2007 | Wantling | B27N 1/006 |
| | | | 106/270 |
| 2011/0248420 A1* | 10/2011 | Cordts | D04H 1/4209 |
| | | | 264/115 |
| 2011/0250461 A1* | 10/2011 | Frost | B32B 5/26 |
| | | | 428/446 |
| 2012/0214012 A1* | 8/2012 | Briner | B32B 21/08 |
| | | | 428/541 |
| 2012/0247617 A1* | 10/2012 | Berlin | A61K 36/15 |
| | | | 144/344 |
| 2013/0108831 A1 | 5/2013 | Wu et al. | |
| 2015/0021805 A1* | 1/2015 | Henderson | D04H 1/44 |
| | | | 264/103 |
| 2015/0231795 A1* | 8/2015 | Battis | B27N 3/04 |
| | | | 425/470 |
| 2016/0222251 A1* | 8/2016 | Agrawal | C08J 7/047 |
| 2016/0326337 A1* | 11/2016 | Farrugia | C08K 3/28 |

FOREIGN PATENT DOCUMENTS

| | | |
|---|---|---|
| JP | 07-100827 A | 4/1995 |
| JP | 08-120551 A | 5/1996 |
| JP | 09-019907 A | 1/1997 |
| JP | 11-335955 A | 12/1999 |
| JP | 2003-531308 A | 10/2003 |
| JP | 2010-180313 A | 8/2010 |
| JP | 2011-099172 A | 5/2011 |
| JP | 2014-047445 A | 3/2014 |
| JP | 2015-092032 A | 5/2015 |
| WO | 2015/049821 A1 | 4/2015 |

* cited by examiner

SHEET MANUFACTURING APPARATUS, SHEET MANUFACTURING METHOD, SHEET MANUFACTURED USING SHEET MANUFACTURING APPARATUS AND SHEET MANUFACTURING METHOD, AND COMPOSITE AND CONTAINER USED IN SHEET MANUFACTURING APPARATUS AND SHEET MANUFACTURING METHOD

CROSS-REFERENCE TO RELATED APPLICATIONS

This application claims priority to Japanese Patent Application No. 2014-182998 filed on Sep. 9, 2014. The entire disclosure of Japanese Patent Application No. 2014-182998 is hereby incorporated herein by reference.

BACKGROUND

Technical Field

The present invention relates to a sheet manufacturing apparatus, a sheet manufacturing method, a sheet which is manufactured using the sheet manufacturing apparatus and the sheet manufacturing method, and a composite and a container which are used in the sheet manufacturing apparatus and the sheet manufacturing method.

Related Art

Obtaining a formed body with a sheet shape or a film shape is performed in the past by accumulating a substance with a fibrous form and utilizing the mutual bonding force between fibers which are accumulated. As a representative example, there is the example of manufacturing paper by forming sheets using water. Sheet forming methods are currently widely in use as one of the methods for manufacturing paper. It is often the case that paper which is being manufactured using a sheet forming method typically has a structure where cellulous fibers which are derived from wood materials or the like are entwined with each other and are partially bonded to each other using a binder (paper strengthening agent (starch paste, water soluble resin, and the like).

Using the paper forming method, it is possible for fibers to be accumulated in a favorably uniform state, and in a case where a paper strengthening agent or the like is used in bonding the fibers to each other, dispersing (distribution) is possible in a state with excellent uniformity within the surface of the paper even with the paper strengthening agent. However, it is necessary to use a large amount of water since the paper forming method is a wet type of method, and there is a necessity for water to be discharged, drying to be carried out, and the like after the paper is formed and the amount of energy and time which is used for this is extremely large. In addition, there is a necessity for the water which is used to be appropriately treated as discharge. Accordingly, it is becoming difficult to respond to recent demands for energy savings, protection of the environment, and the like. In addition, it is often the case that large-scale utilities and infrastructure such as water, power, and water discharge facilities are necessities for the apparatus which is used in the sheet forming method and scaling down the size of the apparatus is difficult. From these points of view, there are expectations for a method, where water is not used or is hardly used which is called a dry type of method, as a method for manufacturing paper instead of the sheet forming method.

For example, a trial for an air laid nonwoven fabric, which includes a highly water absorbent resin and where there is adhesion between fibers using a thermal bonding synthetic resin, is disclosed as a technique in Japanese Unexamined Patent Application Publication No. 2011-099172.

However, the thermal bonding resin in the technique described in Japanese Unexamined Patent Application Publication No. 2011-099172 has the properties of a powder and there is a concern about the resin detaching from between the fibers during an air laid process. It is described in paragraph [0013] of Japanese Unexamined Patent Application Publication No. 2011-099172 that the thermal bonding powder passes through the gaps in the mesh conveyor (mesh belt) when the thermal bonding powder is small and it is difficult for the thermal bonding powder to be fixed between the fibers. Accordingly, it is described in Japanese Unexamined Patent Application Publication No. 2011-099172 that it is appropriate to use a thermal bonding resin powder where the particle diameter is relatively large (20 mesh pass—300 mesh on).

However, when the particle diameter of the resin is large, the uniformity of dispersion of the resin over the manufactured sheet deteriorates. Accordingly, it is desirable that the particle diameter of the resin is smaller in order for the resin to be uniformly dispersed between the particles.

In addition, there is typically suction from below the mesh belt in a case where a web is formed using an air laid process. By doing this, it is thought that it is easy for the resin to become detached from between the fibers when forming the web when the particle diameter of the resin is smaller than the size of the opening of the mesh belt. For this reason, a design is necessary such that it is difficult for resin to become detached from between the fibers even when the particle diameter of the resin is small.

SUMMARY

One of the objects according to several aspects of the present invention is to propose a sheet manufacturing apparatus, a sheet forming method, a sheet which is manufactured using the sheet manufacturing apparatus and the sheet manufacturing method, and a container which is used in the sheet manufacturing apparatus and the sheet manufacturing method where a thermal bonding resin is used so that it is difficult for the thermal bonding resin to become detached from between fibers even when the particle diameter is small.

The present invention is carried out in order to solve at least a portion of the problems described above and is able to be realized as the following aspects or applied examples.

One aspect of a sheet manufacturing apparatus according to the present invention is provided with a mixing unit configured to mix fibers and a composite, where a resin and a wax are integrally combined, in air and a forming unit configured to form a sheet by depositing and heating a mixed material where the fibers and the composite are mixed.

According to this sheet manufacturing apparatus, it is easy for the composite to become attached to the fibers due to the composite becoming charged when mixing and it is difficult for the composite to become detached from the fibers when the web is formed since the composite where the wax and the resin are integrally combined is mixed with the fibers in air. Then, it is possible to manufacture an appropriately strong sheet since the composite and the fibers are bonded.

In the sheet manufacturing apparatus according to another aspect of the present invention, the composite may be configured such that the resin and the wax do not separate when being mixed in the mixing unit.

According to this aspect of the sheet manufacturing apparatus, it is possible for an effect of integrally combining to be provided when mixing since the resin and the wax are not just simply integrally combined when in the state of the composite but are integrally combined to the extent that the resin and the wax do not separate when the composite is being mixed.

In the sheet manufacturing apparatus according to another aspect of the present invention, the composite may be configured such that the resin and the wax are melted and kneaded.

It is possible for the composite to be easily integrally combined due to the resin and the wax being melted and kneaded.

In the sheet manufacturing apparatus according to another aspect of the present invention, the forming unit may have a discharging unit configured to discharge the mixed material, a mesh belt where the mixed material is deposited, and a suction unit configured to suction air which includes the mixed material which is discharged via the mesh belt.

According to this aspect of the sheet manufacturing apparatus, it is possible to suppress detaching of the composite from the fibers even when there is the suction unit although the possibility that the composite will become detached from the fibers increases due to suction via the mesh belt.

In the sheet manufacturing apparatus according to another aspect of the present invention, a size of the composite may be equal to or less than 40 μm.

It is easy for the composite to be mixed between the fibers and it is easy for the composite to be dispersed since the composite is small in a case where the composite is equal to or less than 40 μm. In addition, it is difficult for there to be any effects from gravity and detaching is also difficult since the composite is small.

In the sheet manufacturing apparatus according to another aspect of the present invention, a content ratio of the wax in the composite may be equal to or more than 2% and less than 4%.

According to this aspect of the sheet manufacturing apparatus, it is possible for there to be less of the wax since the effects are exhibited even if the content ratio of the wax in the composite is low.

In the sheet manufacturing apparatus according to another aspect of the present invention, the mixing unit may have a plurality of rotating units which have blades configured to rotate, and the fibers and the composite may be mixed by being passed through the rotating units.

According to this aspect of the sheet manufacturing apparatus, it is easy for the composite to become charged and it is difficult for the composite to become detached from the fibers due to the fibers and the composite being passed through the rotating units which have blades which rotate.

One aspect of a sheet manufacturing method according to the present invention includes mixing fibers and a composite, where a resin and a wax are integrally combined, in air and forming by depositing and heating a mixed material where the fibers and the composite are mixed.

According to this aspect of the sheet manufacturing method, since the composite where the wax and the resin are integrally combined is mixed with the fibers in air, it is easy for the composite to become attached to the fibers due to the composite becoming charged when mixing, it is difficult for the composite to become detached from the fibers when the web is formed, and it is possible to manufacture sheet with excellent uniformity such as strength.

One aspect of a sheet according to the present invention includes fibers and a composite, where a resin and a wax are integrally combined, as a stock material, and the fibers and the composite are bonded.

With this sheet, it is difficult for the composite to become detached from the fibers, and strength and the like is excellent.

One aspect of a container according to the present invention contains a composite which is used by being mixed with fibers and where a resin and a wax are integrally combined.

With this container, it is possible to easily transport and store the composite where the resin and the wax are integrally combined and which has an effect in that it is difficult for the composite to become detached when being used by being mixed with fibers.

One aspect of a composite according to the present invention is where a resin and a wax are integrally combined and is used by being mixed with fibers.

With this composite, detaching of the resin from the fibers is suppressed when the composite is used by being mixed with the fibers.

One aspect of a composite according to the present invention is used in a sheet manufacturing apparatus and is where a resin and a wax are integrally combined.

With this composite, detaching of the resin is suppressed when a web is formed by the composite being mixed with fibers.

BRIEF DESCRIPTION OF THE DRAWINGS

Referring now to the attached drawings which form a part of this original disclosure.

DETAILED DESCRIPTION OF EXEMPLARY EMBODIMENTS

Several embodiments of the present invention will be described below. The embodiments which are described below are descriptions of examples of the present invention. The present invention is not limited in any way by the embodiments below and various modified applications, which are carried out within a scope where the gist of the present invention is not modified, are included in the present invention. Here, all of the configurations which are described below are not necessarily configurations which are essential to the present invention.

1. Sheet Manufacturing Apparatus 1.1. Configuration Outline

Figure 1:
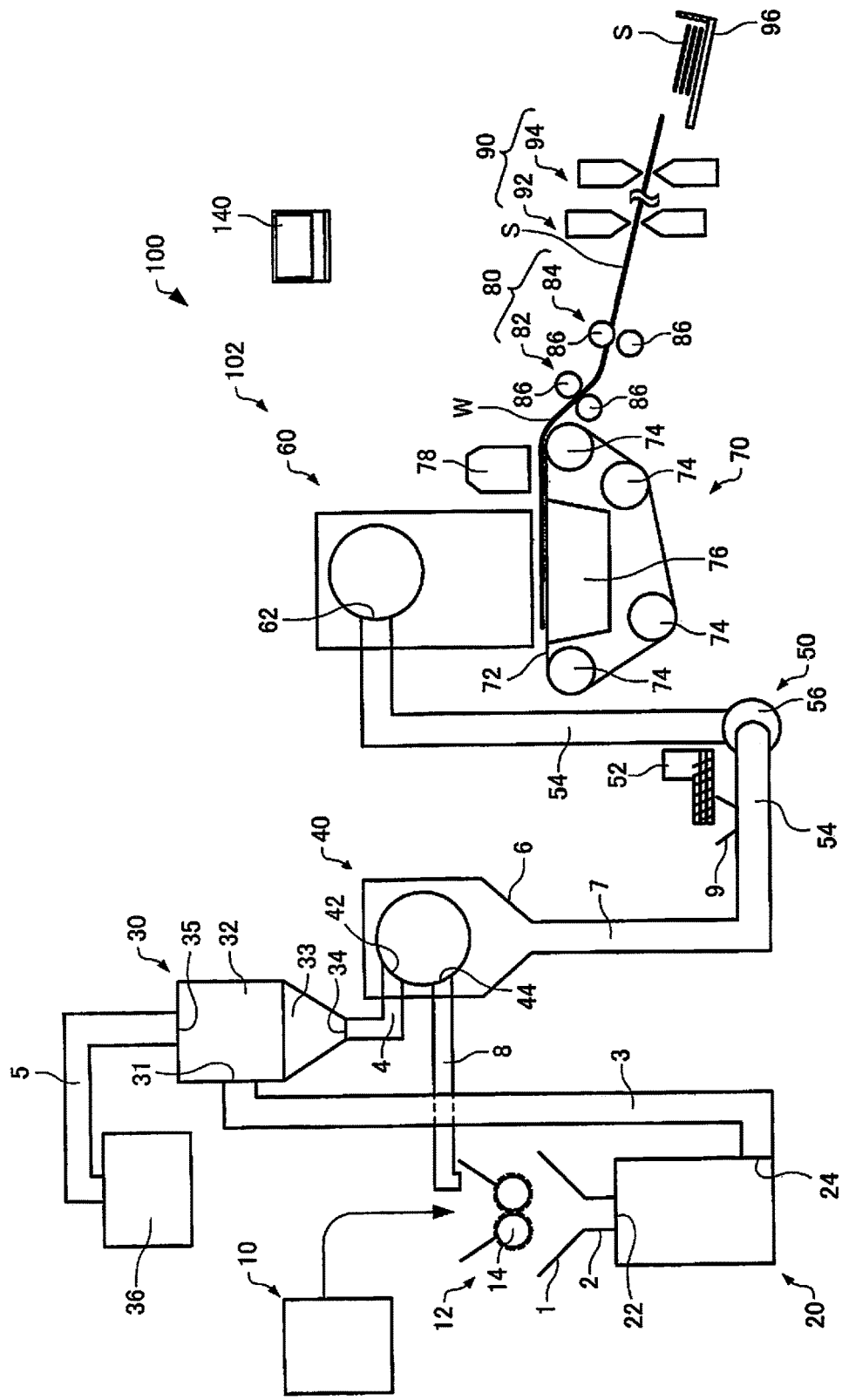
FIG. 1 is a diagram schematically illustrating a sheet manufacturing apparatus according to an embodiment.

Firstly, a sheet manufacturing apparatus according to the present embodiment will be described while referencing the drawings. FIG. 1 is a diagram schematically illustrating a sheet manufacturing apparatus 100 according to the present embodiment.

As described in FIG. 1, the sheet manufacturing apparatus 100 is provided with a supplying unit 10, a manufacturing unit 102, and a control unit 140. The manufacturing unit 102 manufactures sheets. The manufacturing unit 102 has a crushing unit 12, a defibrating unit 20, a classifying unit 30, a screening unit 40, a mixing unit 50, a depositing unit 60, a web forming unit 70, a sheet forming unit 80, and a cutting unit 90. A forming unit in the specifications denotes a combination of the mixing unit 50, the depositing unit 60, and the web forming unit 70.

The supplying unit 10 supplies stock materials to the crushing unit 12. The supplying unit 10 is, for example, an automatic introduction unit which continuously introduces stock materials into the crushing unit 12. The stock materials which are supplied by the supplying unit 10 are, for example, waste paper, pulp sheets, and the like.

The crushing unit 12 turns the stock materials which are supplied by the supplying unit 10 into small pieces by being cut up in air. The shape and size of the small pieces are small pieces of, for example, squares of several centimeters. In the example in the diagram, the crushing unit 12 has a crushing blade 14 and it is possible for the stock materials which are introduced to be cut up by the crushing blade 14. For example, a shredder is used as the crushing unit 12. The stock materials which are cut up by the crushing unit 12 are moved (transported) to the defibrating unit 20 via a pipe 2 after being received by a hopper 1.

The defibrating unit 20 carries out defibrating on the stock materials which are cut up by the crushing unit 12. Here, "defibrating" refers to untangling of the stock materials (defibration object), where a plurality of fibers are bonded, into single fibers. The defibrating unit 20 also has a function of separating substances, such as resin particles, ink, toner, blur-preventing agents, and the like which are attached to the stock materials, from the fibers.

Materials which pass through the defibrating unit 20 are referred to as "defibrated materials". In the "defibrated materials", there are cases of resin (resin for bonding a plurality of fibers to each other) particles, colorants such as ink and toner, and additives such as blur-preventing agents and paper strengthening agents which are separated from the fibers when the fibers are untangled as well as the defibrated material fibers which are untangled. The shapes of the defibrated materials which are untangled are string shapes and ribbon shapes. The defibrated materials which are untangled may exist in a state of being not being intertwined with other fibers which are untangled (independent state) and may exist in a state of being in clumps of being intertwined with other fibers which are untangled (state where so-called "balls" are formed).

The defibrating unit 20 performs a dry type of defibrating in air. In detail, an impeller mill is used as the defibrating unit 20. The defibrating unit 20 has a function of generating an air flow such that the stock materials are suctioned in and the defibrated materials are output. Due to this, it is possible for the defibrating unit 20 to suction in the stock materials along with the air flow from an introduction port 22 due to the air flow which is generated in the defibrating unit 20 and to transport the stock materials to an outlet port 24 due to a defibrating process. The defibrated materials which pass through the defibrating unit 20 are moved to the classifying unit 30 via a pipe 3.

The classifying unit 30 classifies the defibrated materials which pass through the defibrating unit 20. In detail, the classifying unit 30 removes defibrated materials which are relatively small and which are low in density (such as resin particles, colorants, and additives) by separating this from among the defibrated materials. Due to this, it is possible to increase the proportion of fibers which are relatively large and which are high in density among the defibrated materials.

A pneumatic classifier is used as the classifying unit 30. The pneumatic classifier generates a swirling air flow and separates the classified materials due to differences in centrifugal force which is received due to size and density, and it is possible to adjust the classifying points by adjusting the speed of the air flow and the centrifugal force. In detail, a cyclone, an elbow jet, an eddie classifier, or the like are used as the classifying unit 30. In particular, it is possible to appropriately use a cyclone as the classifying unit 30 since the structure is simple.

The classifying unit 30 has, for example, an introduction port 31, a cylindrical part 32 which is connected to the introduction port 31, a reverse conical part 33 which is positioned below the cylindrical part 32 and is continuous with the cylindrical part 32, a lower outlet port 34 which is provided at the lower center of the reverse conical part 33, and an upper outlet port 35 which is provided at the upper center of the cylindrical part 32.

The air flow, on which the defibrated materials which are introduced from the introduction port 31 travels in the classifying unit 30, changes to a circumferential action due to the cylindrical part 32. Due to this, a centrifugal force is applied to the defibrated materials which are introduced and it is possible to separate fibers (first classified materials) where the density is higher than resin particles, colorants, and additives among the defibrated materials and resin particles, colorants, additives, and the like (second classified materials) which are smaller and where the density is lower than the fibers among the defibrated materials. The first classified materials are output from the lower outlet port 34 and are introduced into the screening unit 40 via a pipe 4. On the other hand, the second classified materials are output to the receiving unit 36 from the upper outlet port 35 via a pipe 5.

The first classifying materials which pass through the classifying unit 30 are introduced into the screening unit 40 from an introduction port 42 and the screening unit 40 screens depending on the lengths of fibers. For example, a sifter is used as the screening unit 40. The screening unit 40 has a mesh (a filter, a screen) and it is possible to split up fibers and particles which are smaller than the size of the openings in the mesh and included in the first classified materials (materials which pass through the mesh, the first classified materials) and fibers, non-defibrated pieces, and balls which are larger than the size of the openings in the mesh and included in the first classified materials (materials which do not pass through the mesh, the second classified materials). For example, the first screened materials are moved to the mixing unit 50 via a pipe 7 after being received by a hopper 6. The second screened materials are returned from an outlet port 44 to the defibrating unit 20 via a pipe 8. In detail, the screening unit 40 is a cylindrical shifter which is able to be rotated using a motor. The mesh of the screening unit 40 uses, for example, a metal mesh, expanded metal where a metal plate with notches is stretched, or punching metal where holes are formed in a metal plate using a press or the like.

The mixing unit 50 mixes first screened materials which pass through the screening unit 40 and additive agents which include resin. The mixing unit 50 configures a portion of the forming unit. The mixing unit 50 has an additive agent supplying unit 52 which supplies additive agents, a pipe 54 which transports screened materials and additive agents, and a blower 56. In the example in the diagram, the additive agents are supplied from the additive agent supplying unit 52 to the pipe 54 via a hopper 9. The pipe 54 is continuous with the pipe 7.

An air flow is generated in the mixing unit 50 by the blower 56 and it is possible to transport the first screened materials and the additive agents in the pipe 54 while mixing the first screened materials and the additive agents. Here, the mechanism which mixes the first screened materials and the additive agents is not particularly limited and the mechanism may stir using a blade which rotates or may utilize rotation of a container such as a V type of mixer. In addition, the mixing unit 50 may have a plurality of rotating units which have blades which rotate and may mix the first screened material (fibers) and the additive agents (a composite (resin)) by passing the first screened materials and the additive agents through the rotating unit. The details of the mixing unit 50 and the aspects of the plurality of rotating units will be described later.

A screw feeder may be used as the additive agent supplying unit 52 as shown in FIG. 1 or a disk feeder which is not shown in the diagram may be used. The additive agents which are supplied from the additive agent supplying unit 52 include resin for bonding a plurality of the fibers. At the point in time when the resin is supplied, the plurality of fibers are not bonded. The resin bonds the plurality of fibers by being melted when passing through the sheet forming unit 80.

In the present embodiment, the additive agents which are supplied from the additive agent supplying unit 52 are a composite where resin and wax are integrally combined. The details of the composite will be described later. The composite may be used separately or by being appropriately mixed with other substances. The additive agents which are supplied from the additive agent supplying unit 52 may be in fibrous form or may be in powder form.

Here, as well as the resin which bonds the fibers (which is supplied as the composite), the additive agents which are supplied from the additive agent supplying unit 52 may include coloring agents for coloring the fibers, an antiblocking agent for preventing aggregates of the composite or the fibers, and a flame retarding agent so that it is difficult for the fibers and the like to burn according to the type of sheet which is to be manufactured. The mixed material which pass through the mixing unit 50 (the mixed materials with the first screened materials and the additive agents) are moved to the depositing unit 60 via the pipe 54.

The mixed materials which pass through the mixing unit 50 are introduced into the depositing unit 60 from an introduction port 62 and the defibrated materials (the fibers) which are entwined are untangled and dropped while being dispersed in air. The depositing unit 60 configures a portion of the forming unit. In addition, it is possible for the depositing unit 60 to be referred to as a discharging unit where the mixed materials are dropped onto the web forming unit 70 due to being discharged. Furthermore, the depositing unit 60 untangles the resin which is entwined in a case where the resin in the additive agents which are supplied from the additive agent supplying unit 52 are in a fibrous form. Due to this, it is possible for the depositing unit 60 to deposit the mixed materials on the web forming unit 70 in a more uniform manner.

A cylindrical sifter which rotates is used as the depositing unit 60. The depositing unit 60 has a mesh and drops fibers and particles, which are included in the mixed material which passes through the mixing unit 50, which are smaller than the openings in the mesh (materials which passes through the mesh). The configuration of the depositing unit 60 is, for example, the same as the configuration of the screening unit 40.

Here, the "sifter" of the depositing unit 60 need not have a function of screening specific target materials. That is, the "sifter" which is used as the depositing unit 60 has the meaning of a mesh being provided and all of the mixed materials which are introduced into the depositing unit 60 may be dropped from the depositing unit 60.

The web forming unit 70 forms a web W due to depositing of the passing-through materials which pass through the depositing unit 60. The web forming unit 70 configures a portion of the forming unit and forms the web W using an air laid process. The web forming unit 70 has, for example, a mesh belt 72, stretch rollers 74, and a suction mechanism 76.

The passing-through materials which pass through the openings (openings in the mesh) in the depositing unit 60 deposit on the mesh belt 72 while the mesh belt 72 is being moved. The mesh belt 72 has a configuration of being stretched between the stretch rollers 74 so that it is difficult for the passing-through materials to pass through and air passes through. The mesh belt 72 is moved by the stretch rollers 74 being rotated. The web W is formed on the mesh belt 72 due to the passing-through materials which pass through the depositing unit 60 continuously falling down and settling while the mesh belt 72 is continuously being moved. The mesh belt 72 is, for example, made of metal, resin, cloth, nonwoven material, or the like. An air flow which includes the mixed materials which are dropped from the depositing unit 60 is received by the mesh belt 72 and air passes through the mesh belt 72 so that the mixed materials are captured in the mesh belt 72. The relationship between the openings in the mesh belt 72 and the particle diameter of the composite will be described later.

The suction mechanism 76 is provided below the mesh belt 72 (on the opposite side to the depositing unit 60 side). It is possible for the suction mechanism 76 to generate an air flow which heads downwards (an air flow which heads from the depositing unit 60 to the mesh belt 72). Due to the suction mechanism 76, it is possible for the mixed materials which are discharged by the depositing unit 60 and are dispersed in air to be suctioned onto the mesh belt 72. That is, it is possible for the suction mechanism 76 to be referred to as a suction unit which suctions the mixed materials which are discharged by the depositing unit 60 via the mesh belt 72. Due to this, it is possible to increase the output speed from the depositing unit 60. Furthermore, due to the suction mechanism 76, it is possible to form a down flow in the path over which the mixed materials fall downward and it is possible to prevent entwining of the defibrated materials and the additive agents while falling downward.

As above, the web W is formed in a state of being soft, inflated, and including lots of air due to having gone through the depositing unit 60 and the web forming unit 70 (a web forming process). The web W which is deposited on the mesh belt 72 is transported to the sheet forming unit 80.

Here, in the example in the diagram, a moisture adjusting unit 78 which adjust moisture in the web W is provided. It is possible for the moisture adjusting unit 78 to adjust the quantitative ratio of the web W and water by adding water or water vapor with regard to the web W.

The sheet forming unit 80 forms a sheet S by heating and pressurizing the web W which is deposited on the mesh belt 72. The sheet forming unit 80 configures a portion of the forming unit. It is possible for a plurality of fibers in the mixed materials to be bonded to each other via the additive agents (the resin) in the sheet forming unit 80 due to heat being applied to the mixed materials of the defibrated materials and the additive agents which are mixed in the web W.

For example, a heating roller (heater roller), a heat press forming device, a hot plate, a hot air blower, an infrared heating device, or a flash fixing device is used as the sheet forming unit 80. In the example in the diagram, the sheet forming unit 80 is provided with a first bonding unit 82 and a second bonding unit 84, and the bonding units 82 and 84 are each provided with a pair of heating rollers 86. Due to the bonding units 82 and 84 being configured by the heating rollers 86, it is possible to form the sheet S while the web W is being continuously transported compared to a case where the bonding units 82 and 84 are configured by a pressing apparatus with a plate shape (a plate pressing apparatus). Here, the number of the heating rollers 86 is not particularly limited.

The cutting unit 90 cuts the sheet S which is formed by the sheet forming unit 80. In the example in the diagram, the cutting unit 90 has a first cutting unit 92 which cuts the sheet S in a direction which intersects with the transport direction of the sheet S and a second cutting unit 94 which cuts the sheet S in a direction which is parallel with the transport direction. For example, the second cutting unit 94 cuts the sheet S which passes through the first cutting unit 92.

Due to this, the sheet S which is a single sheet with a designated size is formed. The sheet S which is a single sheet which is cut is output to an outlet unit 96, 1.2. Fibers In the sheet manufacturing apparatus 100 of the present embodiment, the raw material are not particularly limited and it is possible to use a wide range of fibrous materials. Examples of the fibers include natural fibers (animal fibers and plant fibers), chemical fibers (organic fibers, inorganic fibers, organic and inorganic composite fibers), and the like. In more detail, examples include fibers which are formed from cellulose, silk, wool, cotton, hemp, kenaf, flax, ramie, jute, Manila hemp, sisal, softwood, and hardwood and fibers which are formed from rayon, lyocell, cupra, vinylon, acrylic, nylon, aramid, polyester, polyethylene, polypropylene, polyurethane, polyimide, carbon, glass, and metal, and these may be used independently, may be used by being appropriately mixed, and regenerated fibers where refining or the like is performed may be used. Examples of the stock materials includes, for example, waste paper, used cloth, and the like, and it is sufficient if at least one type of these fibers is included. In addition, the fibers may be dried or may be fibers which are contained in or have been immersed in a liquid such as water or an organic solvent. In addition, various types of surface processing may be carried out. In addition, the material of the fibers may be that of a pure substance or the material of the fibers may be such that a plurality of components are included such as impurities, additive agents, and other components.

In this manner, it is possible for the sheet manufacturing apparatus 100 of the present embodiment to use various types of stock materials, but the effects of improving adhesion between the fibers and the composite, which is due to wax being included in the composite which will be described later, is more remarkable with waste paper, pulp sheets, and the like which include cellulose fibers among the stock materials compared to cases of other fibers since cellulose has relatively high hydrophilicity and it is difficult to become charged.

When the fibers which are used in the present embodiment are single independent fibers, the average particle diameters of the fibers (the diameter of a circle (equivalent circular diameter) when the circle is assumed to have an area which is the largest or is the same as the area of a cross section out of the lengths in a direction which is perpendicular to the longitudinal direction in a case where the cross section is not a circle) is equal to or more than 1 μm and equal to or less than 1000 μm on average, is preferably equal to or more than 2 μm and equal to or less than 500 μm, and is more preferably equal to or more than 3 μm and equal to or less than 200 μm.

The lengths of the fibers which are used in the sheet manufacturing apparatus 100 of the present embodiment are not particularly limited, but the lengths of the fibers along the longitudinal direction for single independent fibers is equal to or more than 1 μm and equal to or less than 5 mm, is preferably equal to or more than 2 μm and equal to or less than 3 mm, and is more preferably equal to or more than 3 μm and equal to or less than 2 mm. There are cases where the strength of the sheet is insufficient since bonding with the composite is difficult in a case where the lengths of the fibers are short, but it is possible to obtain sheets with sufficient strength if the lengths of the fibers are in the ranges described above.

In addition, the average length of the fibers, where the length is the length weighted average fiber length, is equal to or more than 20 μm and equal to or less than 3600 μm, is preferably equal to or more than 200 μm and equal to or less than 2700 μm, and is more preferably equal to or more than 300 μM and equal to or less than 2300 μm. Furthermore, the lengths of the fibers may have a distribution and a for the lengths of single independent fibers, in a distribution which is obtained from a sample which is equal to or more than 100, is equal to or more than 1 μm and equal to or less than 1100 μm, is preferably equal to or more than 1 μm and equal to or less than 900 μm, and is more preferably equal to or more than 1 μm and equal to or less than 600 μm in a case where a normal distribution is assumed.

It is possible for the thicknesses and lengths of the fibers to be measured using various types of optical microscopes, scanning electron microscopes (SEM), transmission electron microscopes, fiber testers, and the like. In addition, it is possible to perform observations in the state where both ends of a single independent fiber are pulled so as not to break according to requirements using cross-sectional observations by appropriately carrying out preprocessing of observation samples according to requirements in a case of microscopic observation.

1.3. Composite

The composite which is used as the additive agents which are supplied from the additive agent supplying unit 52 in the sheet manufacturing apparatus 100 of the present embodiment is where the resin and the wax are integrally combined.

1.3.1. Composite Structure

The state where the resin and the wax are integrally combined in the composite refers to a state where it is difficult for the resin or the wax to separate from the composite inside the sheet manufacturing apparatus 100 and/or in the web W and in the sheet S.

That is, the state where the resin and the wax are integrally combined in the composite refers to at least one state out of a state where the resin and the wax are compatible and are in the same phase, a state where the resin and the wax are in a so-called sea-island structure (either of the resin or the wax may be the sea or the island), a state where the resin and the wax are attached to each other, a state where the wax is structurally (mechanically) fixed to the resin, a state where the resin and the wax form an aggregate due to electrostatic force, Van der Waals force, or the like, and a state where the resin and the wax are chemically bonded.

In addition, the state where the resin and the wax are integrally combined in the composite may be a state where the wax is attached to the resin even in a state where the wax is enveloped by the resin or may be a state where the wax envelopes the resin (a state where the resin is covered by the wax). Furthermore, there may be a state where these states exist at the same time.

Figure 2A:
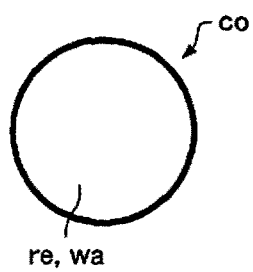
FIGS. 2A to 2F are schematic diagrams illustrating several examples of cross sections of a composite according to an embodiment.

FIGS. 2A to 2F schematically illustrate several aspects of cross sections of the composite where the resin and the wax are integrally combined. As a detailed example of the aspects of the composite where the resin and the wax are integrally combined, there is, for example, an example of a composite co where the resin and the wax are compatible and are in the same phase as shown in FIG. 2A. It is possible to confirm that the resin and the wax are included in the composite co which is shown in FIG. 2A using, for example, an analysis means which uses various types of chromatography, spectroscopy, and the like.

Figure 2B:
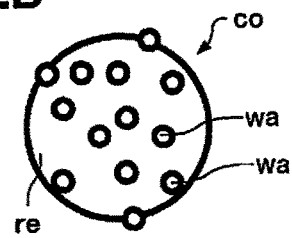

In addition, as a detailed example of the aspects of the composite where the resin and the wax are integrally combined, there is an example of a composite co with a so-called sea-island structure where resin re is the matrix and wax wa is the domain, that is, a composite co which has a structure where one of or a plurality of wax wa is dispersed over and envelopes an inner section which is resin re as shown in FIG. 2B. In this case, it is not necessary for all of the wax wa, which is enveloped, to be enveloped and a portion of the wax wa may be exposed or protrude as the surface of the composite. Furthermore, although not shown in the diagram, the resin re may be the domain and the wax wa may be the matrix.

Figure 2C:
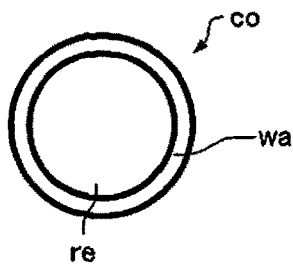
Figure 2D:
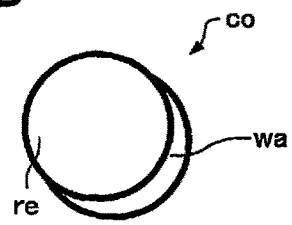
Figure 2E:
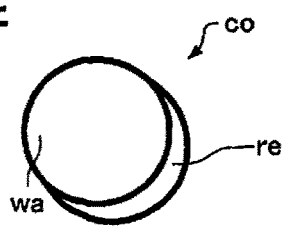

Furthermore, wax wa may be arranged so as to cover the surface of resin re as shown in FIGS. 2C and 2D and resin re may be arranged so as to cover the surface of wax wa as shown in FIG. 2E. In these examples, the quantity of the resin re and the wax wa are in a one-to-one relationship, but it is not a problem if the relationship is one-to-many or many-to-many.

Figure 2F:
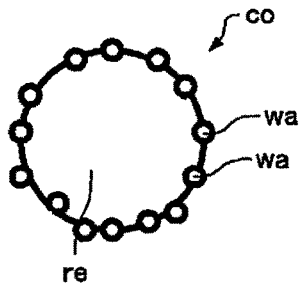

Furthermore, as a detailed example of the aspects of the composite where the resin and the wax are integrally combined, there is an example of a composite co where wax wa is adhered and/or attached to the surface of resin re as shown in FIG. 2F. Although not shown in the diagram, the resin re may be adhered and/or attached to the surface of the wax wa. The adhering and/or attaching of both components in these examples may be based on electrostatic force, Van der Waals force, or the like and it is possible for it to be seen as a state where both components aggregate.

It is possible to confirm the composites co as shown in FIGS. 2A to 2F using, for example, an analysis means which uses a structural analysis method such as an electron microscope or various types of chromatography, spectroscopy, and the like.

It is possible for the structure of the composites co as shown in FIGS. 2B to 2F to coexist, and the composite which is used in the present embodiment may be a structure where the structure of one of the particles includes at least one type of the structures described above or may be particles where a plurality of the particles have structures which are different to each other in the particles in the composite.

In addition, the outer shapes of the composites are all shown in the examples in FIGS. 2A to 2F as being close to schematically spherical, but the outer shape of the composite is not particularly limited and may be a shape such as a disk shape or an unregular shape. However, the shape of the composite is more preferably a shape which is as close to a spherical shape as possible so that it is easy for the composite to be arranged between the fibers in the mixing unit 50.

In addition, it is difficult for the resin and the wax to separate during mixing in the mixing unit 50 with the composites with any of the structures shown in FIGS. 2A to 2F, but it is understood that the structures of the composites which are given as examples in FIGS. 2A to 2E are structures where it is even more difficult for the resin and the wax to separate. Here, in the present application, it is desirable that none of the resin and the wax separate with regard to the quantity of the composite particles throughout the whole of the powder in the composite which is a powder but it is difficult for there to be absolutely no separation in practice. For this reason, the state of there being no separation refers to the composite particles, with a quantity which is equal to or more than 70% on average with regard to the quantity of the composite particles throughout the whole of the powder, where the resin and the wax do not separate.

1.3.2. Composite Function

Several aspects of the composite where the resin and the wax are integrally combined are given as examples and it is difficult for the resin and the wax to separate in all of the aspects when receiving various types of processes inside the sheet manufacturing apparatus 100 and when the web W and the sheet S are formed.

The wax forms the composite due to being integrally combined with the resin and generates an absorbing power between the composite and the fibers. For this reason, it is possible for it to be difficult for the composite to become detached from between the fibers when depositing as the web W on the mesh belt 72 in the web forming section 70 of the sheet manufacturing apparatus 100. Due to this, it is possible for the wax to set the mechanical strength of the sheet S which is being manufactured using the sheet manufacturing apparatus 100 to a designated amount. That is, it is difficult for the composite of the present embodiment to become detached from between the fibers since there is sufficient adhesive force with regard to the fibers when the composite is arranged between the fibers. It is thought that the reason why it is possible to obtain such an effect is because it is easy for the wax to generate a triboelectric charge and there is an action where an electrostatic force is generated due to friction by the composite being mixed with the fibers in air in the mixing unit 50 and the composite (the resin) becomes attached with regard to the resin.

1.3.3. Composite Material

As the types of resin which are a component of the composite, either natural resins or synthetic resins may be used and either thermoplastic resins or thermosetting resins may be used. In the sheet manufacturing apparatus 100 of the present embodiment, it is preferable that the resin which configures the composite is a solid at room temperature and thermoplastic resins are more preferable when considering bonding of the fibers using heat in the sheet forming unit 80.

As natural resins, there are the examples of rosin, dammar, mastic, copal, amber, shellac, dragon's blood, sandarac, colophony, and the like, there are examples where the natural resins are used singularly or appropriately mixed, and the natural resins may be appropriately modified.

As the thermosetting resins among synthetic resins, there are the examples of thermosetting resins such as phenol resin, epoxy resin, melamine resin, urea resin, unsaturated polyester resin, alkyd resin, polyurethane, and thermosetting polyimide resin.

In addition, as the thermoplastic resins among synthetic resins, there are the examples of AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, and polyether ether ketone. These resins may be used singularly or appropriately mixed. In addition, copolymerization or modification may be performed and examples of these groups of resins include styrene resins, acrylic resins, styrene-acrylic copolymer resins, olefin resins, vinyl chloride resins, polyester resins, polyamide resins, polyurethane resins, polyvinyl alcohol resins, vinyl ether resins, N-vinyl resins, styrene-butadiene resins, and the like.

On the other hand, it is possible to use various types of natural and synthetic wax as the wax. For example, there are the examples of montan wax, paraffin wax, ester wax, carnauba wax, rice wax, candelilla wax, microcrystalline wax, polyethylene wax, polypropylene wax, microcrystalline wax, amide wax, metal soap, and high grade alcohol.

The wax has the properties where is easier to become charged, it is difficult to discharge charge, and it is easy to take on charge. The wax which is used in the present embodiment is a solid and relatively soft at room temperature. In addition, the wax which is used in the present embodiment preferably has a melting point of equal to or more than 60° C. and preferably has viscosity, which is at a temperature which is higher by 10° C. or more than the melting point, of equal to or less than 5 Pa·s. Furthermore, it is preferable that it is possible to repeat melting and solidifying without a chemical reaction or breakdown when melted by heating.

Here, as the differences between the resin and the wax described above, there is the typical example of viscosity. That is, there are examples of the point where the viscosity of the resin is higher than the viscosity of the wax when, for example, melted at the same temperature in a case where the chemical structure of the resin and the wax is similar. In addition, it is possible to give the example of the point of a case where the wax has a low molecular weight compared to the resin and has a melting point with a structure which is similar to the resin as a difference.

Here, it is possible to measure the viscosities, melting points, and the like of the resin and the wax using typical methods and it is possible to measure the melting point using differential scanning calorimetry (DSC). Due to this, it is possible to measure the composite using DSC and to confirm the existence of and to identify the type of the resin and the wax by combining other analysis means (IR (infrared spectroscopy), NMR (nuclear magnetic resonance), MS (mass spectrometry), various types of chromatography, and the like) according to requirements.

The content of the wax in the composite is not particularly limited, it is possible to freely add the wax within a range which does not impede adhering by the resin, and the content of the wax may be, for example, equal to or more than 0.01 mass % and equal to or less than 50 mass %. However, from the point of increasing the action of electrostatic adhesion to the resin in the composite particles, the content of the wax in the composite is equal to or more than 1 mass % and equal to or less than 50 mass % and is preferably equal to or more than 2 mass % and equal to or less than 50 mass %. In addition, from the point of maintaining a high mechanical strength of the sheet S which is being manufactured, the content of the wax in the composite is equal to or more than 0.1 mass % and equal to or less than 10 mass %, is more preferably equal to or more than 1 mass % and equal to or less than 5 mass %, and is even more preferably equal to or more than 2 mass % and equal to or less than 4 mass %. If the content of the wax in the composite is with this range, it is possible to retain the additional amounts (mass) between fibers of at least equal to or more than ½, more preferably equal to or more than ⅔, and even more preferably equal to or more than ¾ when at least forming the web W.

1.3.4. Composite Manufacturing

It is possible for the composite to be formed by, for example, sufficient mixing (frictional mixing) of the particles of the resin and the particles of the wax in air. In this case, it is thought that it is possible to obtain the composite with an aspect where the wax particles are attached to or eat into the surface of the resin particles. Although shown in an experiment example which will be described later, it is thought that, when forming the composite, the proportion of the wax particles which are attached to the fibers is higher and it is difficult to form the composite when the composite is mixed along with other substances such as fibers in air.

In addition, it is possible for the composite to be formed by the resin and the wax being melted and kneaded. It is possible to obtain the composite with the sea-island structure described above or the composite with a covered structure when the resin and the wax are melted and kneaded. It is possible for these structures to be appropriately formed by mainly adjusting the conditions such as the softness of the resin and the melting point of the wax and the temperature when melting and kneading. Here, the difference between the melting point of the wax and the melting point of the resin is preferably equal to or less than 50° C., is more preferably equal to or less than 40° C., and is even more equal to or less than 30° C.

In a case where the composite is formed by melting and kneading, it is possible to obtain the composite in the state of a powder with a designated particle diameter by pulverizing a pellet which is formed by melting and kneading. It is possible for the melting and kneading to be performed using, for example, a kneader, a banbury mixer, a single screw extruder, a multiscrew extruder, a twin roller, a triple roller, a continuous kneader, a continuous twin roller, and the like. It is possible for the pulverizing to be performed using a pulverizing device such as a hammer mill, a pin mill, a cutter mill, a pulverizer, a turbo mill, a disk mill, a screen mill, and a jet mill. By appropriately combining these, it is possible to obtain particles of the composite. In addition, the process of pulverizing may be performed in steps such as fine pulverizing so as to reach the target particles after rough pulverizing so that the particle diameters are initially approximately 1 mm. In each step even in a case such as this, it is possible to appropriately utilize the apparatuses which are given as examples. It is also possible to use a freezing and crushing method in order to further increase the effectiveness of the pulverizing of the composite. There are cases where various large segments of the composite which is obtained in this manner are included and classifying may be carried out using a well-known classifying apparatus according to requirements in order to achieve the composite with a target size.

The particle diameter of the particles of the composite (volume average particle diameter) is preferably equal to or less than 100 μm, is more preferably equal to or less than 60 μm, and is even more preferably equal to or less than 40 μm. When the average particle diameter is small, it is possible to suppress detaching of the composite from between the fibers due to the weight of the composite since the gravitational force which works on the composite is small, and it is possible to suppress detaching of the composite from between the fibers due to air flows (wind) which is generated due to the suction mechanism 76 and the like since the air resistance of the composite is small and detaching of the composite from between the fibers due to mechanical vibrations. In addition, although it is possible to appropriately set the openings of the mesh belt 72, passing through the mesh belt 72 is suppressed even in a case where the particle diameter of the composite is smaller than the openings in the mesh belt 72 (the size of the holes which objects pass through) since the composite becomes attached to the fibers). That is, it is possible for the composite of the present embodiment to obtain further remarkable effects in a case where the particle diameter of the composite is smaller than the openings in the mesh belt 72.

Here, the lower limit of the average particle diameter of the particles of the composite is not particularly limited, is, for example, 10 μm, and is arbitrary in a range where it is possible for the composite to be turned into powder using a method such as pulverizing. In addition, the average particle diameter of the particles of the composite may have a distribution and it is possible to obtain an effect of suppressing detaching of the composite from between the fibers described above as long as the resin and the wax are integrally combined.

It is possible for the volume average particle diameter of the particles of the composite to be measured using, for example, a particle distribution measuring apparatus with a laser diffraction and scattering method as the measurement principle. As the particle distribution measuring apparatus, there are the examples of, for example, a particle distribution analyzer (for example, "Microtrac UPA" manufactured by Nikkiso Co., Ltd.) with a dynamic light scattering method as the measurement principle.

The volume average particle diameter of the composite which is pulverized is appropriately set to balance increasing of the strength of the sheet S which is formed (tensile strength, tear strength, and the like), reducing irregularities in the strength of the sheet S which is formed, and the like, and pulverizing and classifying operations are performed in combination with this. That is, when the volume average particle diameter of the composite is large in a case where the amount of the composite which composes the sheet S is constant, it is possible to increase the bonding force between the fibers and to increase the strength of the sheet S while the dispersion (distribution) of the composite within the surface of the sheet S becomes sparse since the quantity of the composite is small and it is easy for irregularities in strength to occur in the surface of the sheet S. On the other hand, when the volume average particle diameter of the composite is small in a case where the amount of the composite which composes the sheet S is constant, the fixing force between the fibers is weak and the strength of the sheet S is low while the dispersion (distribution) of the composite within the surface of the sheet S becomes dense and irregularities in strength in the surface of the sheet S are reduced. In this manner, it is thought that the properties of strength and color irregularities in the sheet S have a relationship of a trade off with each other in relation to the volume average particle diameter of the composite in a case where the amount of the composite which composes the sheet S is constant and a preferred volume average particle diameter exists for establishing both (or compromising between) these two properties.

It is thought that the composite particles become more strongly attached to the fibers using electrostatic force than in a case of independent resin particles. In addition, it is understood that the effect of the wax is not lost in a case where a pigment is included in the resin particles and the effect is exhibited even when an anti-blocking agent is contained or there is coating. The compatibility of the wax with other substances is not high, but it is thought that there is a tendency for it to be easy for the wax to gather around the interface with various substances or the surface of the resin when in the composite by being integrally combined with the resin. As a result, it is inferred that the electrostatic force of the composite is increased. Furthermore, it is typically difficult for static electricity to accumulate when the level of moisture is high, but there is a tendency for the adhesive force of the composite to the fibers to increase due to the composition with the wax even when, for example, some water is included in a case where the fibers are cellulose.

1.3.5. Other Components

Here, it is described that coloring agents for coloring the fibers and flame retarding agents so that it is difficult for the fibers or the like to burn may be included in the composite, but it is possible for the composite to be more easily obtained in a case where at least one of these other components are included using a composition where these other components are melted and kneaded. In addition, a composition with an anti-blocking agent for preventing aggregates of the composite or the resin is possible by mixing the powder of the composite and the powder of the anti-blocking agent using a high speed mixer or the like after the power of the composite is formed.

It is possible for various types to be used as the anti-blocking agent, but it is preferable to use an anti-blocking agent which is a type which is arranged on the surface of the composite (which may be coating or the like) since water is not used or hardly used at all in the sheet manufacturing apparatus 100 of the present embodiment. As the anti-blocking agent, there are examples of fine inorganic particles and it is possible to obtain an aggregate suppressing effect (an anti-blocking effect) which is highly superior by fine inorganic particles being arranged at the surface of the composite.

Here, aggregates refer to a state where the same type or different types of objects exist by being physically in contact due to electrostatic force or Van der Waals force. In addition, the composition with a plurality of objects (for example, powder) does not necessarily refer to all of the objects which configure the composition being arranged so as to be scattered in a case of a state where there is no aggregates. That is, the state where there is no aggregates also includes states where a portion of the objects which configure the composition are aggregated, and these states are included as "the state where there is no aggregates" in the composition with a plurality of objects even when the amount of the objects which are aggregated in this manner is equal to or less than 10 mass % or preferably to the extent of being equal to or less than 5 mass % of the total of the composition. Furthermore, there are states where the particles of the powder are touching each other in a case where the powder is packaged or the like, but these states are included as the state where there are no aggregates in a case where a state where the particles are scattered is possible by adding an external force to the extent that the particles are not damaged such as gentle stirring, dispersion using an air flow, being dropped, or the like.

As detailed examples of the material of the anti-blocking agent, it is possible for there to be the examples of titanium oxide, aluminum oxide, zinc oxide, cerium oxide, magnesium oxide, zirconium oxide, strontium titanate, barium titanate, and calcium carbonate.

The average particle diameter (numerical average particle diameter) of the particles of the anti-blocking agent is not particularly limited, is preferably 0.001 μm to 1 μm, and is more preferably 0.008 μm to 0.6 μm. It is possible to favorably perform coating of the surface of the composite and it is possible for a sufficient aggregate suppressing effect (anti-blocking effect) to be gained if the particle diameter of the primary particles of the anti-blocking agent is within this range.

It is possible to obtain the effects described above if the added amount in a case where the anti-blocking agent is added to the composite is equal to or more than 0.1 parts mass and equal to or less than 5 parts mass with regard to 100 parts mass of the composite, and it is possible for the added amount of the anti-blocking agent to preferably be equal to or more than 0.2 parts mass and equal to or less than 4 parts mass and more preferably equal to or more than 0.5 parts mass and equal to or less than 3 parts mass with regard to 100 parts mass of the composite from the point of view of increasing the effects and/or suppressing detaching of the anti-blocking agent from the sheet which is being manufactured.

As an aspect where the anti-blocking agent is arranged on the surface of the composite, there are the examples of coating and the like, and the whole of the surface of the composite need not necessarily be covered. In addition, an appropriate coating ratio is selected according to the circumstances since, although the coating ratio may exceed 100%, there are cases where the action of bonding the composite and the fibers is impaired when the covering ratio is equal to or more than 300%.

It is possible to more easily mix the composite and the fibers in the mixing unit 50 since it is possible for it to be extremely difficult for aggregates to occur in the composite when the composite is composed with the anti-blocking agent. That is, it is possible for the composite to be swiftly dispersed into a space and for highly uniformly mixed materials to be formed when the composite is composed with the anti-blocking agent.

It is possible for the aggregate suppressing effect to be evaluated in a case where the anti-blocking agent coats the composite by, for example, measuring the angle of repose. Measuring the angle of repose is possible by measuring on the basis of, for example, the method in "Alumina Powder—Part 2: Determination of Physical Properties—2: Angle of Repose" in JIS R 9301-2-2: 1999. In the composite which is coated with the anti-blocking agent, the angle of repose is smaller, aggregating between the composite is suppressed, and it is possible to confirm the functioning of the anti-blocking agent with regard to the composite which is not coated by the anti-blocking agent.

The composite may contain other components. As the other components, there are the examples of, for example, organic solvents, surfactants, antiseptic agents and preserving agents, oxidization preventing agents and ultraviolet absorbing agents, oxygen absorbing agents, and the like.

The fibers and the composite described above are mixed in the mixing unit 50 and it is possible to appropriately adjust the mixture ratio of the fibers and the composite depending on the strength, application, and the like of the sheet S which is being manufactured. The proportion of the composite with regard to the fibers is equal to or more than 5 mass % and equal to or less than 70 mass % if the sheet S which is being manufactured is for an office application such as copying paper and is preferably equal to or more than 5 mass % and equal to or less than 50 mass % from the point of view of obtaining a preferred mixture for the mixing unit 50 and from the point of view of it being even more difficult for the composite to become detached due to gravity in a case where the mixed materials are formed into a sheet shape.

1.4. Mixing Unit

The mixing unit 50 which is provided in the sheet manufacturing apparatus 100 of the present embodiment has the function of mixing the fibers and the composite where the resin and the wax are integrally combined. At least the fibers and the composite are mixed in the mixing unit 50. Components other than the fibers and the composite may be mixed in the mixing unit 50. "Mixing the fibers and the composite" is defined in the present specifications as the composite being positioned between the fibers inside a space (system) with a constant capacity.

The process of mixing in the mixing unit 50 of the present embodiment is a fluid dynamic mixing process which is a method (dry type) where the fibers and the composite are mutually scattered by an air flow due to being introduced in the air flow. "Dry type" in mixing refers to a state of being mixed in air and not in water. That is, the mixing unit 50 may function in a dry state or may function in a state where there is liquid which exists as an impurity or liquid which is intentionally added. In a case where liquid is intentionally added, it is preferable for the liquid to be added to an extent where energy and time for removing the liquid due to heating or the like is not excessively large in subsequent processes. Here, in the case of this method, it is more preferable for the air flow in the pipe 54 and the like to be an eddy flow in order to improve the efficiency of the mixing.

The processing capacity of the mixing unit 50 is not particularly limited as long as it is possible to mix the fibers (fibrous materials) and the composite and it is possible to appropriately design and adjust the processing capacity of the mixing unit 50 according to the manufacturing capacity (throughput) of the sheet manufacturing apparatus 100. It is possible to perform adjusting of the processing capacity of the mixing unit 50 by changing the flow amount of air, the amount of materials to be introduced, and the movement amount of the materials in order to move the fibers and the composite inside the pipe 54.

The mixed materials which are mixed by the mixing unit 50 may be further mixed using another configuration such as a sheet forming unit. In addition, in the example in FIG. 1, the mixing unit 50 has the blower 56 which is provided in the pipe 54, but may further have a blower which is not shown in the diagram.

The blower is a mechanism which mixes the fibers and the composite and has a rotating unit which has blades which rotate. Due to the rotating of the blades, the fibers and/or the composite rub together due to the blades and the fibers and/or the composite collide with the blades. In addition, due to the rotating of the blades, the fibers and the fibers, the fibers and the composite, and/or the composite and the composite collides and rub together due to the air flow which is formed by the blades.

Due to this colliding and rubbing, it is thought that at least the wax components of the composite become charged and an adhesive force (electrostatic force) for attaching the composite to the fibers is generated. The strength of this adhesive force relies on the shapes of the fibers and the composite and the structure of the blower (the shape of the blades which rotate and the like). It is possible to obtain sufficient adhesive force even in a case where one blower which is the blower 56 is provided as shown in FIG. 1, but it is possible to obtain a stronger adhesive force due to another blower being further provided on the downstream side of the additive agent supplying unit 52. The number of blowers which are installed is not particularly limited. In addition, in a case where a plurality of blowers are provided, the functions of each of the blowers may be portioned out such as providing a blower with a larger air blowing force and a blower with a larger stirring force (capacity to become charge). By doing this, there are cases where it is possible to further increase the adhesive force of the composite to the fibers and it is possible to further suppress detaching of the composite from between the fibers when forming the web W.

1.5. Operational Effects

It is difficult for the composite to become detached from between the fibers when forming the web since the composite, which is mixed with the fibers in the mixing unit 50 of the sheet manufacturing apparatus 100 of the present embodiment, is where the wax and the resin are integrally combined. Then, it is possible to manufacture the sheet S with excellent uniformity such as strength and excellent dispersion of the resin since the composite and the fibers are bonded in the sheet forming unit 80.

The composite which is used in the sheet manufacturing apparatus 100 of the present embodiment is highly superior in terms of the adhesive force of the composite to the fibers. It is easy for the composite particles to carry static electricity, the amount of charge in the particles as a result is high, and the adhesive force of the composite to the fibers is improved due to the wax being added so as to be integrally combined with the resin and due to the wax having the property such that it is easy to carry static electricity.

2. Sheet Manufacturing Method

A sheet manufacturing method according to the present embodiment includes a process of mixing fibers and a composite where resin and wax are integrally combined in air and a process of forming by depositing and heating mixed materials where the fibers and the composite are mixed. Since the fibers, the resin, the wax, and the composite are the same as described in the paragraphs for the sheet manufacturing apparatus described above, detailed description will be omitted.

The sheet manufacturing method according to the present embodiment may include at least one process which is selected from a group which consists of a process of cutting pulp sheets, waste paper, or the like which are stock materials in air, a process of defibrating where the stock materials are untangled into fibrous form in air, a process of classifying Where impurities (toner and paper strengthening agents) and fibers (short fibers) which are shortened due to defibrating are classified in air from defibrated materials which are defibrated, a process of screening where longer fibers (long fibers) and non-defibrated pieces where sufficient defibrating is not carried out are screened from the defibrated materials in air, a process of dispersing where mixed materials are dropped while being dispersed in air, a process of forming where the shape of a web or the like is formed by the mixed materials which are dropped being deposited in air, a process of drying where a sheet is dried according to requirements, a process of winding where the sheet which is formed is wound into a roll shape, a process of cutting where the sheet which is formed is cut, and a process of packaging where the sheet which is manufactured is packaged. Since the details of the processes are the same as described in the paragraphs for the sheet manufacturing apparatus described above, detailed description will be omitted.

3. Sheet

The sheet S which is manufactured using the sheet manufacturing apparatus 100 or the sheet manufacturing method of the present embodiment mainly refers to a sheet with a sheet form with at least the fibers described above as the stock materials. However, the sheet S is not particularly limited to having a sheet form and may have a board shape, a web shape, or a shape with concavities and convexities. It is possible for the sheet in the present specifications to be divided into paper or nonwoven materials. Paper includes, for example, formats which are formed into a sheet shape with pulp or waste paper as the stock materials and includes recording paper, wall paper, wrapping paper, colored paper, drawing paper, drafting paper, and the like with the aim of writing or printing. Nonwoven materials are thicker than paper and have lower strength and typically include nonwoven material, fiber board, tissue paper, kitchen paper, cleaning paper, filters, liquid absorbing materials, sound absorbing bodies, shock absorbing materials, mats, and the like.

Here, the gap between the fibers is wide (the density of the sheet is low) in a case of nonwoven materials. In contrast to this, the gap between the fibers is narrow (the density of the sheet is high) in a case of paper. For this reason, it is possible to more remarkably realize the actions and functions of suppressing detaching of the composite from the filers, uniformity of the strength when in sheet form, and the like using paper as the sheet S which is manufactured using the sheet manufacturing apparatus 100 or the sheet manufacturing method of the present embodiment.

4. Container

A container (containing vessel) of the present embodiment contains the composite described above where the resin and the wax are integrally combined and which is used by being mixed with the fibers.

The composite of the present embodiment is supplied to the mixing unit 50 using a filter and opening and closing of a valve. The composite of the present embodiment is supplied in a state where the outer appearance is that of a powder. For this reason, it is possible for the apparatus to be configured so that, for example, the composite is supplied directly to the mixing unit 50 via a pipe or the like after being manufactured. However, it is thought that the composite travels over a conveyance path as a product due to the location where the apparatus is installed and there are cases where moving and storing of the composite are performed after the composite is manufactured.

The container of the present embodiment has a container chamber where the composite is contained and it is possible for the composite to be contained in the container chamber. That is, it is possible for the container of the present embodiment to be a cartridge for the composite and it is possible for the composite to be easily transported and stored.

The shape of the container is not particularly limited and it is possible for the shape of the container to be the shape of a cartridge which fits with the sheet manufacturing apparatus 100. It is possible for the container to be formed by, for example, a typical polymer material. In addition, the container may be an aspect which is a solid box shape or may be as aspect which is a flexible film shape (bag). It is preferable that the material which configures the container be configured by a material which has a high glass transition temperature and melting point compared to the material of the composite which is contained.

The container chamber where the composite is contained is not particularly limited as long as the composite is retained by being contained. It is possible for the container chamber to be formed using film, a mold body, or the like. In a case where the container chamber is formed using film, the container may be formed by including a mold body (casing) so that the film which forms the container chamber is contained. In addition, the container chamber may be formed using a relatively solid mold body.

The film and the mold body which form the container chamber may be configured by a deposition film of polymer or metal or the like and may be a multilayer structure. In a case where the container is formed using a plurality of members such as the film and the mold body, a weld section and an adhesion section may be formed. In addition, it is preferable that the film and the mold body be formed with a material where the air permeability is low in a case where the composite (powder) which is contained receives effects such as alterations due to contact with air. It is preferable that the material at a section, which is in contact with the composite which is contained, out of the material of the film and the mold body which form the container chamber be stable with regard to the composite.

The shape and the capacity of the container chamber are not particularly limited. The composite is contained in the container chamber, but solids or gases which are inactive with regard to the composite may be contained along with the composite. The volume of the composite which is contained in the container chamber is not particularly limited.

The container chamber may have a transfer port which links the inner part of the container chamber and the outside of the container and where it is possible for the composite to be taken out to the outside of the container. In addition, a transfer path other than the transfer port may be formed in the container chamber. As the other transfer path, there may be, for example, a configuration using an open valve or the like. In a case where an open valve is provided in the container chamber, the position where the open valve is arranged is not particularly limited, but there are cases where it is preferable to be arranged on the opposite side with regard to the direction in which gravity operates in the normal posture when being moved, transported, or used since the composite is output when pressure is released to the atmosphere in a case where there is pressure or the like inside the container chamber.

5. Other Items

Water is not used or is hardly used in the sheet manufacturing apparatus and the sheet manufacturing method of the present embodiment as described above, but it is possible to manufacture a sheet by appropriately adding water with the goal of adjusting moisture by spraying or the like according to requirements.

As the water in this case, it is preferable to use pure water or extra pure water such as ion exchange water, ultrafiltration water, reverse osmosis water, or distilled water. It is particularly preferable that it is possible that water, which is subject to a sterilization treatment by the water being subject to ultraviolet irradiation, adding of hydrogen peroxide, or the like, suppresses generating of mold and bacteria over a long period of time.

In the present specifications, the reference to "uniform" refers to the relative positioning of one component with regard to another component in an object which is able to be defined as two or more components and/or components in two or more phases are the same as each other or substantially equal over the entirety of a system and in each section of a system in a case of uniform dispersing or mixing. In addition, uniformity of coloring and uniformity of tone refers the absence of light and dark and the same concentration in colors in a planar view of the sheet.

Terms such as "uniform", "the same", and "equal intervals" with the meaning, where the density, distance, dimensions, and the like are the same, are used in the present specifications. Although it is desirable that these are equal, there are times when the values are not the same and deviations are included in the totals due to errors, variance, and the like since it is difficult for values to be absolutely the same.

6. Experiment Examples

Experiment examples are shown below and the present invention will be further described, but the present invention is not limited in any way by the examples below.

6.1. Composite Manufacturing Method

Coarsely pulverized material A which are carnauba wax are obtained by repeating an operation of carnauba wax (melting point of 86° C.) being processed for 45 seconds and rested for 120 seconds four times or more in a high speed mill (HS-20 manufactured by Scenion Inc.).

(1) 9.7 kg of polyester resin (glass transition point of 54° C. and softening temperature of 96° C.)

(2) 0.3 kg of coarsely pulverized material A of carnauba wax

After the materials described above are mixed, a pellet is obtained by cutting a strand, which is output by introducing the materials described above into a twin screw kneading extruder and melting and kneading the materials described above at 80° C. to 120° C., into lengths of 5 mm. The pellet is introduced again into the twin screw kneading extruder and melted and kneaded at 80° C. to 120° C., and a pellet is obtained in the same manner.

The pellet which is obtained is introduced into a jet mill after the pellet is roughly pulverized by performing processing in a high speed mill for 30 seconds, and a powder where the particle diameter is in a range of 1 μm to 60 μm is obtained.

A powder B of the composite, which includes particles with an average particle diameter of 11 μm and a particle diameter of 5 μm to 25 μm, is obtained by passing the powder which is obtained using the jet mill through a classifying apparatus.

(3) 6 kg of the powder B of the composite (4) 0.1 kg of hydrophobized ultrafine particles of titanium dioxide (anti-blocking agent)

By performing stirring of the materials described above for 60 seconds in a henschel mixer, the surface of the powder B of the composite is coated with hydrophobized ultrafine particles of titanium dioxide (particle diameter of 18 nm). (Whether coating is carried out is detected using the angle of repose of the particles. The angle of repose is measured on the basis of the method in "Alumina Powder—Part 2: Determination of Physical Properties—2: Angle of Repose" in JIS R 9301-2-2: 1999 and whether coating is carried out is confirmed by a reduction in the angle of repose.)

The composite which is obtained has a structure of being integrally combined where the resin is enclosed in the wax. In addition, composites which are experiment examples 1 to 4 and experiment examples 6 to 8 are manufactured in the experiment to be equivalent to experiment example 5 shown in table 1 with modification to the amounts of (1) and (2) described above and all else the same. Furthermore, composites which are experiment examples 9 to 11 are manufactured by changing the carnauba wax respectively to paraffin wax (melting point of 71° C.), ester wax (melting point of 82° C.), and polyethylene wax (melting point of 100° C.).

6.2. Resin Particles and Wax Particles

Kneading is performed in the same manner as in the composite particles manufacturing method described above without the (2) roughly pulverized wax materials A being added and a resin pallet where wax is not included is obtained. The processing of the pallet in the same manner as described above is performed and a resin powder C, which include particles with an average particle diameter of 11 µm and particle diameter of 5 µm to 25 µm, is obtained.

(1) 6 kg of the resin powder C (2) 0.1 kg of hydrophobized ultrafine particles of titanium dioxide By performing stirring of the materials described above for 60 seconds in a henschel mixer, the surface of the resin powder C is coated with hydrophobized ultrafine particles of titanium dioxide (particle diameter of 18 nm) and coated resin particles D are obtained. (Whether coating is carried out is detected using the angle of repose of the particles. The angle of repose is measured on the basis of the method in "Alumina Powder—Part 2: Determination of Physical Properties—2: Angle of Repose" in JIS R 9301-2-2: 1999 and whether coating is carried out is confirmed by a reduction in the angle of repose.)

(3) 4.85 kg of the coated resin particles D (4) 0.15 kg of coarsely pulverized material A of carnauba wax A uniform powder is obtained by adding the materials described above into a polyethylene bag and gently mixing. The wax and the resin are separate in the powder. The wax and the resin in the powder are separate. The powder is equivalent to the powder of experiment example 12 in table 1.

6.3. Method for Evaluating Retention Rates of Resin Between Fibers Suction Method (1) 16 g of needle-leaf bleached kraft pulp (NBKP)

(2) 4 g of mixed materials of composite particles or resin particles and wax particles (3) Resin content ratio: 4 g/(16 g+4 g)=20 mass %

Pulp and resin particles are added into a transparent polyethylene bag of 520 mm×600 mm×0.030 mm with the amounts described above being measured and stirred using an air flow by an air gun blowing air, and mixed materials, which are pulp and the composite or pulp, resin particles, and wax particles (power for each experiment examples), are mixed.

Figure 3:
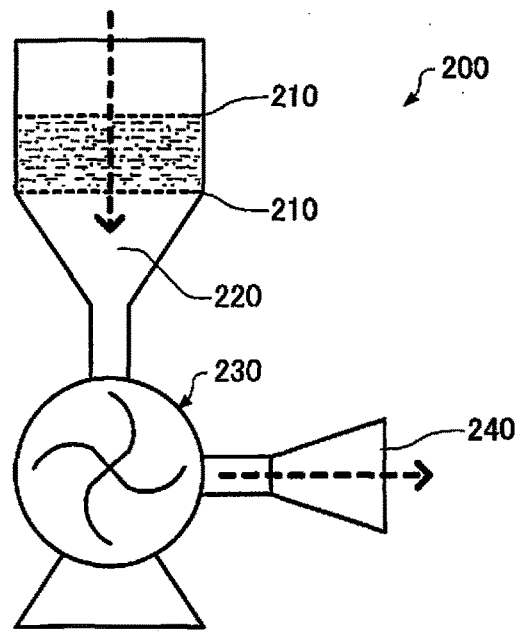
FIG. 3 is an outline diagram illustrating a suction apparatus which is used in experiment examples.

5.0 g of each of the mixtures for the experiment examples are output and gently spread equally into a standard sifter with 140 mesh with a pin set. After this, the sifter is set in a suction apparatus so that the upper side of the sifter is covered. An outline diagram of a suction apparatus 200 is shown in FIG. 3. The suction apparatus 200 which is used is purpose made and consists of a funnel part 220 with a funnel shape where a sifter 210 is set, an exhaust apparatus 230, and an exhaust filter 240 with the configuration which is shown in FIG. 3. In this apparatus, exhaust speed of the exhaust apparatus 230 is adjusted so that the wind speed at the mesh surface of the sifter 210 is 25 m/s±1 m/s in a case where nothing is placed on top of the sifter 210. Here, the aspect of the apparatus need not necessarily be the aspect which is shown in FIG. 3 if the wind speed conditions are satisfied. A value, when the amounts of each of the mixtures which remain are measured after setting the mixtures in the sifter 210 in a state of being interposed by the sifter 210 and performing suction for 30 seconds in the suction apparatus 200, is set as X (g).

Here, a particle retention rate RV (%) is calculated using the following formula.

$$RV=(5\times0.2-(5-X))/(5\times0.2)\times100=(X-4)\times100$$

It is shown that more of the mixture is retained between the pulp fibers as the particle retention rate increases and an ideal state is where RV=100% and the particles of the mixture do not pass through the sifter 210 due to suction.

Here, the amount of the mixture which is interposed by the sifter 210 is set at 5.0 g in each of the experiment examples, but this amount may be appropriately adjusted due to experimental efficiency and the like. However, the mixture with a volume which is able to cover the entire surface of the surface of the sifter is interposed in the sifter 210 which is used in measuring. There is a tendency for the RV values which are obtained to not depend on the amount of the mixture in a case where an amount of the mixture which satisfies the conditions is selected.

6.4. Experiment Results

Table 1 summarizes the sample characteristics and particle retention rates for each of the experiment examples.

TABLE 1

| Experiment Example | Content of Resin in Composite (mass %) | Wax Type | Content of Wax in Composite (mass %) | Particle Retention Rate |
|---|---|---|---|---|
| 1 | 90 | carnauba wax (melting point 86° C.) | 10 | 90.0% |
| 2 | 93 | ↑ | 7 | 91.2% |
| 3 | 95 | ↑ | 5 | 94.1% |
| 4 | 96 | ↑ | 4 | 91.2% |
| 5 | 97 | ↑ | 3 | 95.3% |
| 6 | 98 | ↑ | 2 | 90.5% |
| 7 | 99 | ↑ | 1 | 68.7% |
| 8 | 100* | ↑ | 0 | 39.3% |
| 9 | 97 | paraffin wax (melting point 71° C.) | 3 | 95.1% |
| 10 | 97 | ester wax (melting point 82° C.) | 3 | 96.4% |
| 11 | 97 | polyethylene wax (melting point 100° C.) | 3 | 93.6% |
| 12 | 100** | carnauba wax (melting point 86° C.) | 3*** | 34.5% |

Figure 4:
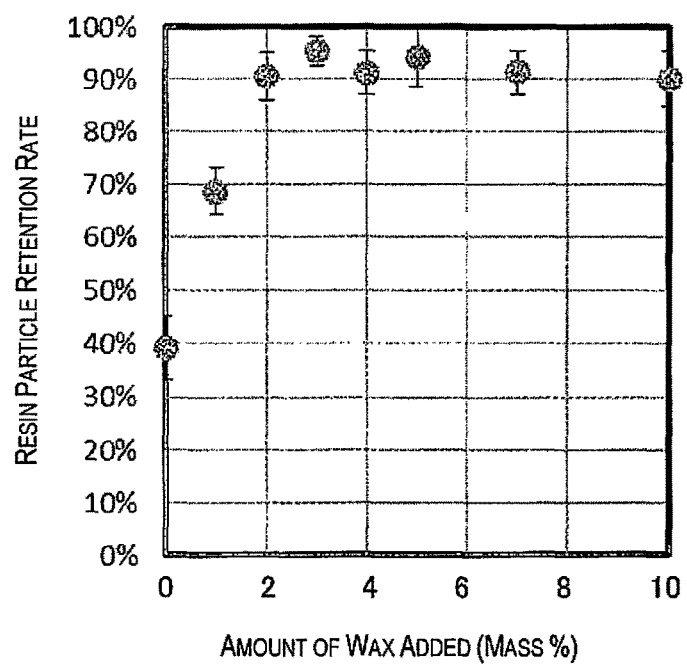
FIG. 4 is a distribution graph which plots particle retention rates with regard to the content of wax according to experiment examples.

*Resin particles
**Resin particles where resin and wax are separate and which is not the composite
***Content of wax particles with regard to total amount of resin particles and wax particles A distribution graph which plots particle retention rates with regard to the content of the wax in experiment examples 1-8 is shown in FIG. 4. When looking at the plotting in FIG. 4, it is understood that the particle retention rates remarkably increase in a region where the content of the wax is less than 3 mass %. In particular, a sharp increase in the particle retention rates is seen at a region of 0 mass % to 2 mass %. That is, it is understood that it is difficult for the composite particles to sharply become detached from between the fibers due to a composition with even a small amount of the wax (for example, 0.001 mass % or preferably 0.01% mass %). In addition, it is understood that substantially 68.7% (substantially two thirds) of the particles are retained where the content of the wax is around 2 mass %.

In addition, it is understood that the particle retention rate hardly changes and is constant in the region where the content of the wax is equal to or more than 3 mass %. Although this phenomenon is restricted to the realm of inference, it is possible to describe this phenomenon in the following manner. Stirring due to air or a machine is used when mixing the pulp and the composite particles, but severe collisions are repeated between the composite particles and the fibers at this time. Due to this, there is a high possibility that the resin particles and the fibers carry static electricity as a result of friction being generated between the fibers and the composite particles. The resin is normally an insulating body and has the characteristics of it being easy to carry static electricity. It is also easy for the wax to carry static electricity. One reason is thought to be that, in a case where the wax is added to the resin as the composite, there are the characteristics where it is even easier to charge static electricity due to friction than the resin by itself. For this reason, the composite particles are insulating and become strongly charged, and it is possible to infer that the composite particles become strongly attached to the fibers due to electrostatic force as a result.

In addition, it is thought that one reason is that wax which exists within the composite particles does not contribute to the frictional charging since the effect does not become remarkable when a certain amount (around 2 mass %) is not added. There is a high possibility that the wax hardly dissolves in a case of being mixed with the resin and the like since the wax is not very compatible with the other compounds. There is a possibility that the amount of wax which is dissolved in the resin heads towards saturation at low concentrations. Due to these characteristics, it is thought that the amount of wax which is able to exist inside the particles reaches saturation and considerable wax exists on the surface even when, for example, the content of the wax is 2 mass %.

However, it is thought that there is no contribution to further effects of triboelectric charge if there is a certain amount of wax with regard to the surface area, and the particle retention effects may be seen to be saturated with the addition of wax of equal to or more than 3 mass % as a result. In addition, considering the results of experiment examples 9 and 10 in relation to the addition of wax, it is thought that, although there are differences in the types of waxes, the most important element is the amount of wax which is added, and it is inferred that the content of the wax being equal to or more than 2 mass % and equal to or less than 4 mass % is the particularly preferable range since there are further costs with a composition with more wax.

On the other hand, in a case where the resin particles are composed separately without the wax being integrally combined with the resin, the resin particle retention rate is an extremely low value when looking at the results for experiment example 12. These results are results which are similar to the case of only the resin particles without a composition with wax (experiment example 8). Closely observing experiment example 12 shows that the wax mostly detaches after mixing with the fibers. It is thought that this is because adding the wax separately to the resin particles does not bond the wax and the resin particles (the wax and the resin particles are not integrally combined) and there is separation due to an external force. In this case, it is inferred that the adhesive force with the fibers does not improve since the characteristics where it is easy to carry electrostatic charge do not exist due to there being no wax on the surface or in the vicinity of the resin particles and there being no wax inside the particles. In addition, in integrally combining the resin particles and the wax particles by mixing in air, the extent of stirring inside a polyethylene bag as in experiment example 12 does not integrally combine the resin particles and the wax particles, and it is thought that integral combining will be possible through stronger stirring (for example, being passed through a blower or the like). In addition, it may not be possible to reach integral combining in experiment example 12 since there are the fibers along with the resin particles and the wax particles during stirring. From this, it is understood that it is important that the wax is integrally combined with the resin.

The present invention is not limited to the embodiments described above and various modifications are possible. For example, the present invention includes configurations which are the same in practice as the configurations described in the embodiments (configurations which have the same functions, method, and results or configurations which have the same object and results). In addition, the present invention includes configurations where non-essential portions of the configurations described in the embodiments are replaced. In addition, the present invention includes configurations which accomplish the same operational effects and configurations where it is possible to realize the same object as the configurations described in the embodiments. In addition, the present invention includes configurations where known techniques are added to the configurations which are described in the embodiments.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A sheet manufacturing apparatus comprising:
   a mixing unit configured to mix, in air, fibers and a composite that includes a resin and a wax which are integrally combined; and
   a forming unit configured to form a sheet by depositing and heating a mixed material where the fibers and the composite are mixed.
2. The sheet manufacturing apparatus according to claim 1, wherein
   the mixing unit is configured to mix the fibers and the composite that is configured not to be separated into the resin and the wax when being mixed in the mixing unit.

3. The sheet manufacturing apparatus according to claim 1, wherein
the mixing unit is configured to mix the fibers and the composite that includes the resin and the wax which are melted and kneaded.

4. The sheet manufacturing apparatus according to claim 1, wherein
the forming unit has a discharging unit configured to discharge the mixed material, a mesh belt where the mixed material is deposited, and a suction unit configured to suction air which includes the mixed material which is discharged via the mesh belt.

5. The sheet manufacturing apparatus according to claim 1, wherein
the mixing unit is configured to mix the fibers and the composite that has a size equal to or less than 40 μm.

6. The sheet manufacturing apparatus according to claim 1, wherein
the mixing unit is configured to mix the fibers and the composite that includes the wax with a content ratio in the composite which is equal to or more than 2% and less than 4%.

7. The sheet manufacturing apparatus according to claim 1, wherein
the mixing unit has a plurality of rotating units which have blades configured to rotate, and the fibers and the composite are mixed by being passed through the rotating units.

8. A sheet manufacturing method comprising:
mixing, in air fibers and a composite that includes a resin and a wax which are integrally combined; and
forming by depositing and heating a mixed material where the fibers and the composite are mixed.

9. A sheet which includes fibers and a composite that includes a resin and a wax which are integrally combined, as a stock material, wherein
the fibers and the composite are bonded.

10. A container configured to contain a composite where a resin and a wax are integrally combined and which is used by being mixed with fibers.

11. A composite where a resin and a wax are integrally combined and which is used by being mixed with fibers.

12. A composite which is used in a sheet manufacturing apparatus and where a resin and a wax are integrally combined.

13. A sheet manufacturing apparatus comprising:
a blower which generates air flow and mixes a defibrated material including a fiber with an additive agent to produce a mixture of the defibrated material and the additive agent, the additive agent including a composite where resin and wax are integrally combined;
a sifter which has a net, and which untangles the mixture and screens the mixture by the net;
a belt, the screened mixture which passes through the sifter being deposited at an upper side of the belt to make a web; and
a heating roller which heats the web to form a sheet.

14. The sheet manufacturing apparatus according to claim 13,
wherein the sifter is a rotary cylindrical sifter.

* * * * *